Patented May 1, 1934

1,957,053

UNITED STATES PATENT OFFICE 1,957,053

FRUIT FLAVORED FOOD

George L. Teller, Riverside, Ill.

No Drawing. Application July 7, 1930,
Serial No. 466,032

6 Claims. (Cl. 99—5)

This invention relates to the manufacture of fruit flavored food products which conserve the natural acids and mineral salts of fruits. Dieticians place great value upon these acids and salts and recommend their general use and particularly advise their use in special circumstances. However, these fruit acids and mineral salts of the fruits can ordinarily be availed of as foods for human consumption only by the eating of the entire ripe fruit or by the drinking of the juices of the ripe fruit. Various natural causes make it difficult to have the entire fruit or the fruit juices at hand in an edible condition. This invention aims to make these natural fruit acids and mineral salts more readily and conveniently avilable for human consumption and in so doing conserves valuable ingredients of normally perishable foods.

In order to conserve these acids and mineral salts of the fruit juices various attempts have been made to obtain them in a suitable form by evaporation of the juices, but these attempts have to date met with little or no success.

Most all, if not all, of the fruits at present well known and suited for human consumption contain in their juices certain ingredients which make it impossible to evaporate the juices to a dry pulverulent condition. I have found that in these juices there is a considerable quantity of lævulose originally present or formed during evaporation which will not crystallize during evaporation, as will the dextrose and sucrose present, but will rather become a gummy mass which adheres to the other solids during evaporation and because of its sticky nature makes it impossible to produce a dry pulverulent powder from the residue. Moreover the lævulose readily undergoes decomposition at comparatively low temperatures and this decomposition leads to a burnt flavor in the product. Dry powders made from the ingredients of fruit juices containing the natural fruit acids and mineral substances of fruit and having the natural fruit flavor have long been sought after and desired in commerce but in my knowledge have not, up to the present, been successfully produced.

My invention contemplates primarily the conservation of the natural fruit acids and salts in forms suitable for human consumption. In order to reduce these juices by evaporation to obtain the acids and salts in concentrated form I remove the lævulose prior to evaporation or mechanically distribute the lævulose and other solids of the juices upon and throughout a suitable bulky article of food which may be incorporated into the juice so that upon evaporation the lævulose cannot produce a gummy mass due to its wide dispersion upon the substance so introduced into the juice. In some instances the production of the latter product is commercially desirable in that it produces an article of food in form all ready for consumption; while in other instances for commercial reasons it is preferable to eliminate the lævulose to obtain a dry fruit flavored powder mixed or unmixed with a cereal food article or mixed or unmixed with a sweetening agent such as sugar in crystalline form.

One of the forms of my invention consists in the following procedure. The juice of any of the well known fruits such as strawberries, pineapples, grapes, pears, cherries, apples, etc., is segregated by pressing the juice from the remainder of the particular fruit, or otherwise extracting the juice from the body of the fruit. Thereafter a small quantity of yeast, preferably compressed yeast, in amount sufficient to promptly ferment the juice is added to the liquid and fermentation is then allowed to proceed until substantially all of the sugar content of the juice has been fermented into alcohol and carbon dioxide. The gas thus formed separates itself from the juice while the alcohol may readily escape or be distilled from the liquor and, if desired, the dead yeast and some coagulated protein may be separated from the juice by settling and drawing off the supernatant liquid, or by filtering.

The temperature of the solution will then be raised sufficiently to kill the yeast and prevent further fermentation. After fermentation and separation of the alcohol and the yeast from the liquor, the residual liquor may be evaporated to dryness with the addition of a suitable powdered cereal product or other suitable bulky substance forming a residue which is easily pulverizable, especially since the lævulose originally contained in the juice has been removed. Valuable vitamines of the yeast contained in the juice solution will remain in the evaporated residue, being in themselves of material value as food.

To facilitate evaporation and to restore the sweetness of the juice, starch, sugar, or dextrose, in crystalline or powdered form, or in solution, or lactose, either in crystalline or powdered form, or in solution may be added to the liquor remaining after fermentation. Where the inverting strength of the acid present in the juice is great enough to invert sucrose to thus produce lævulose, it is preferable to add dextrose or lactose to the juice which is being evaporated, as neither of these sugars will be so inverted. However, if the fruit juice contains acids whose inverting strength is insufficient to invert sucrose, the sucrose itself may be added and evaporated down with the juice. In any case, if a dry pulverizable residue is not desired, the evaporation may be terminated while the liquor is still in the form of a magma and the product may be used in that condition if desired. The amount of sweetening agent to be added to the liquor prior to evaporation, or subsequently, or in both instances may be varied for the purpose of restoring or exceeding to any desired extent the normal sweetness characteristic of the particular fruit flavor involved.

When dextrose or lactose is added to the liquor remaining after fermentation and distillation of the alcohol I have found that evaporation of the liquor proceeds more rapidly aided, no doubt, by the growth of the sugar crystals. The dextrose and lactose, of course, do not have the same sweetness as the sucrose which has been previously eliminated from the juice, hence if one wishes he may add also sucrose to the dry product in any amount desired.

When lactose is added to the liquor after fermentation and distillation, evaporation may be conducted rapidly at a high temperature, preferably above 200° F. producing an excellent dry pulverulent product with much of the normal sweetness of the fruit ingredients restored by the lactose present. Care should be exercised during evaporation of a solution containing either lactose, dextrose, or sucrose to guard against burning of the sugar content or scorching of the other ingredients of the juice by too prolonged application of heat after the product has reached dryness.

Instead of adding dextrose, lactose or sucrose to the residual liquor following the fermentation, there may be added to the liquor a cereal product suitable for human consumption in a form adapted to facilitate the evaporation of the residual liquor to a pulverizable residue.

The cereal product, which is preferably in the form of a cereal bran or cereal meal made from any of the well-known cereal grains, may also be added to unfermented fruit juice and the whole mixture then evaporated to dryness. Ordinarily it will be found that somewhat larger quantities of the cereal must be added to the unfermented juice than to the fermented juice. In either case, whether the cereal product be added to the fermented or unfermented juice, it will in the finished product be found to have absorbed the natural acids of fruit juice and mineral salts of the juice and to partake of the natural flavor of the fruit.

An exceptionally valuable fruit flavored food product may be obtained by mixing with fermented or unfermented fruit juice a cereal bran which has been substantially freed from starch, dextrins, and sugars for the purpose of rendering the cereal less fattening. When this bran and fermented fruit juice have been evaporated to dryness the bran will carry the natural flavor of the fruit juice and will contain the natural acids and mineral salts of the juice, being exceptionally palatable without being fattening. To this dry mixture there may be added any of the usual sweetening agents such as sucrose and other sugars, or if desired, a nonfattening sweetening agent such as xylose or saccharine. This nonfattening bran may also be added to a natural unfermented fruit juice and the solution may then be evaporated to dryness, the lævulose in the juice being so dispersed upon the bran as to prevent the ultimate product from being gummy. This product will, of course, be somewhat more fattening than the combination of fermented fruit juice and bran.

It should be understood that this invention involving the making of food products containing natural fruit flavors is applicable not only to the several fruits mentioned above but to all other fruits too numerous to mention. Various modifications of the processes and products above mentioned may be devised which will nevertheless employ the principles of this invention as set forth in the appended claims.

Having described my invention, I claim:

1. A method of making a product in dry friable form comprising forming a solution containing fruit juices, converting the lævulose therein by fermentation and removing the fermented products of the sugar from the solution, thereafter evaporating to dryness the remaining liquid in admixture with dextrose in amount sufficient to hasten materially the drying action and to restore the sweetness lost by the fermentation.

2. A method of producing a dry friable product having the flavor of a ripe fruit whose juice normally contains lævulose, consisting of fermenting the sugars in the juice of said fruit and separating the fermentation products of the sugars from the juice, and thereafter evaporating the remaining liquor to dryness in admixture with a sugar which will not be converted into lævulose by the acid present in the liquor employing enough of said sugar to restore the sweetness removed by fermentation.

3. In a method of producing a dry pulverulent product from the ingredients of fruit juice, the step of eliminating by fermentation the lævulose normally contained in the fruit juice.

4. A method of producing a dry pulverulent product from a fruit juice comprising removing the lævulose from the juice by fermentation and thereafter evaporating the resultant liquor to dryness and pulverizing the residue.

5. In the manufacture of fruit juice concentrate, the step of eliminating by fermentation the lævulose normally contained in the fruit juice.

6. A dry friable food product comprising dried solids of a fruit juice free from the original lævulose content of the juice from which it is produced.

GEORGE L. TELLER.